United States Patent [19]

Price

[11] Patent Number: 4,477,202

[45] Date of Patent: Oct. 16, 1984

[54] PIN LOCK

[76] Inventor: John G. Price, P.O. Box 3197, Montgomery, Ala. 36109

[21] Appl. No.: 541,452

[22] Filed: Oct. 13, 1983

[51] Int. Cl.$^3$ ............................ B25G 3/00; F16D 1/00
[52] U.S. Cl. .................................... 403/316; 403/324; 403/379; 464/153
[58] Field of Search ............... 403/378, 379, 324, 316; 464/153, 155, 182, 184

[56] References Cited

U.S. PATENT DOCUMENTS 2,642,096  6/1953  Holmes .......................... 464/184 X
2,735,684  2/1956  Longee et al. .................. 464/184 X
3,606,407  9/1971  Pendergast ....................... 403/24

Primary Examiner—Andrew V. Kundrat
Attorney, Agent, or Firm—Sherman & Shalloway

[57] ABSTRACT

A pin lock is disclosed which comprises a shaft coupling connecting a drive shaft with a driven shaft, preferably in the environment of heavy machinery. The pin lock basically consists of an elongated shaft including means at one end for coupling the shaft to drive means and including receptacle means at another end which receives the driven shaft. After the driven shaft is placed into the receptacle, a pin is inserted into holes formed in the receptacle and this pin overlies the driven shaft to prevent radial movement thereof.

12 Claims, 5 Drawing Figures

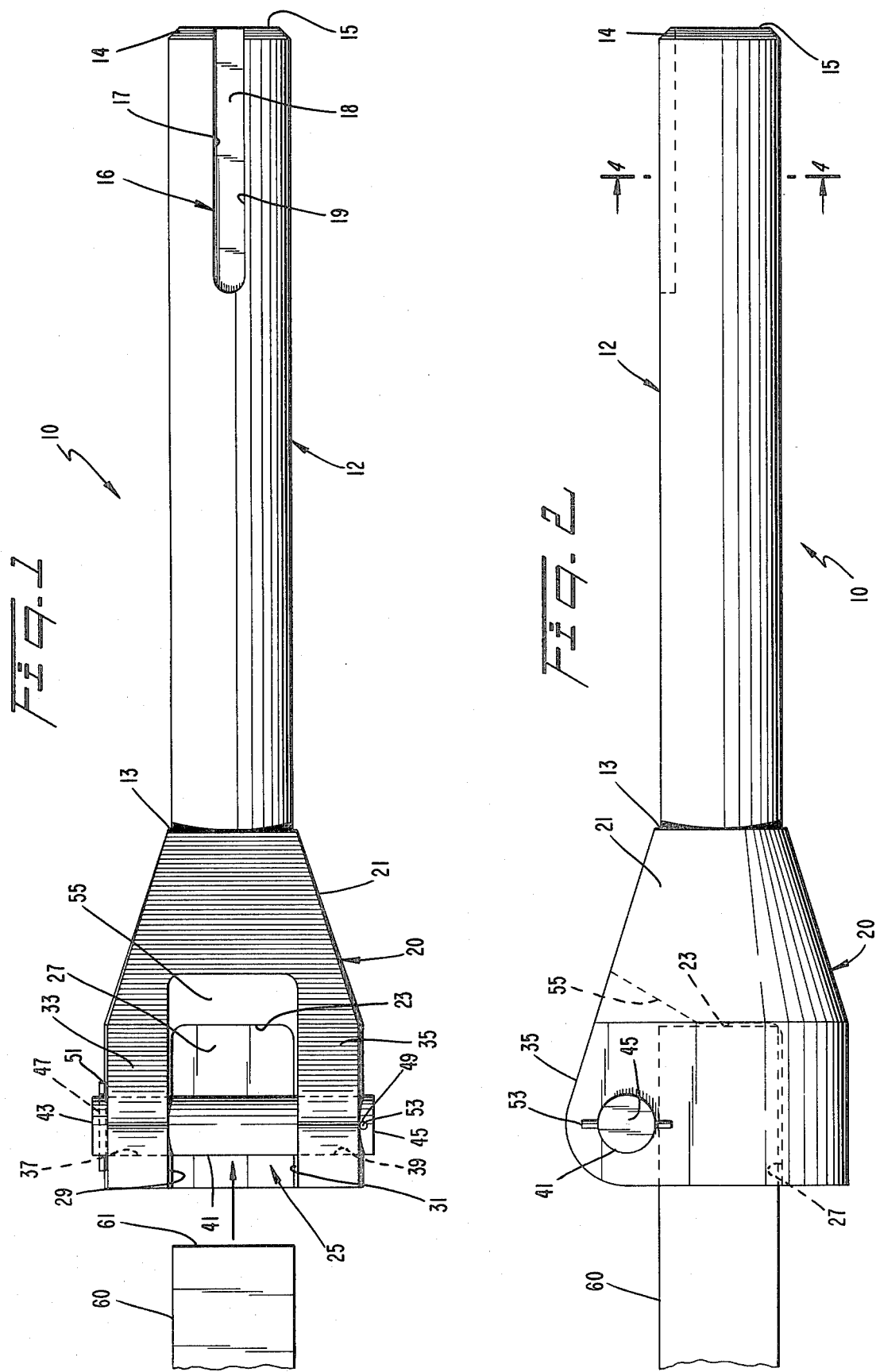

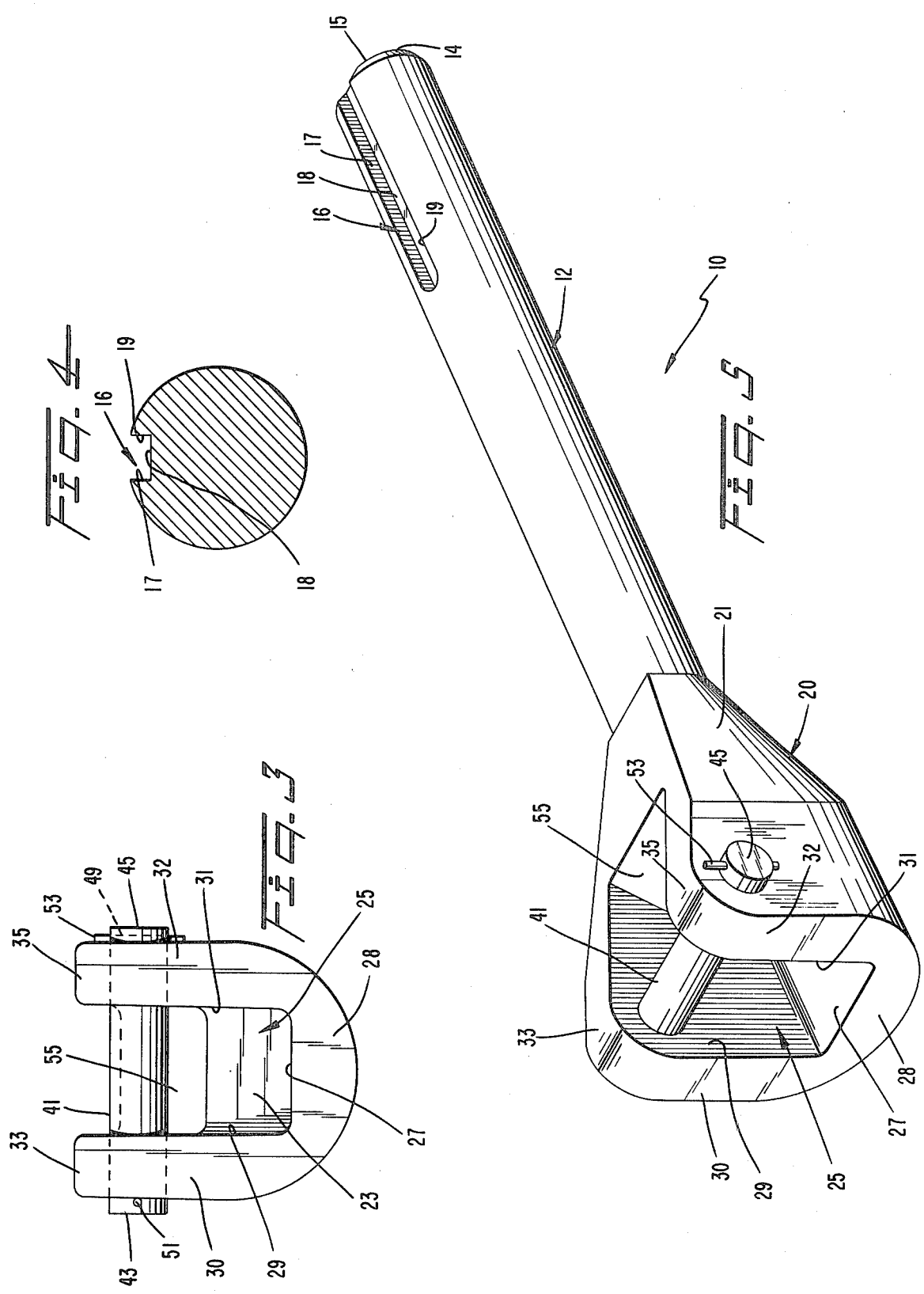

PIN LOCK

BACKGROUND OF THE INVENTION

This invention relates to a pin lock designed to act as a coupling between a drive shaft and a driven shaft. Devices which perform this general function are known in the prior art. In this vein, the following prior art is known to applicant:

U.S. Pat. No. 364,503 to Fenner which discloses a universal joint including cube-like block C which fits within receptacle B. A pin E passes through receptacle B, block C and a pin D connected to fork A to couple fork A to receptacle B. Since this device requires an intermediary block C and, further, since the coupled halves are both fork-like, applicant's invention is believed distinct therefrom.

U.S. Pat. No. 693,577 to Vivinus which discloses a further universal joint including a cylindrical receptacle a, a knob-like rod b and a pin d, e which extends through holes formed in receptacle a and which is retained in position by transverse locking pins f. This patent is believed distinct from applicant's invention in that the knob b does not conform to receptacle a and, further, since the pin d, e extends through the knob b.

U.S. Pat. No. 2,211,164 to Rippenbein which discloses a coupling between a receptacle 24 and a rectangular cross-section rod 25 which are retained together by a sleeve 26 which is tightened in place by a screw 27. The provision of a separate piece of structure 26, 27 to retain two members 24, 25 together is believed to distinguish applicant's invention from this patent since, in applicant's invention, the receptacle and pin provide the sole retention means.

U.S. Pat. No. 3,285,668 to Fearon which discloses a receptacle 10 secured to a cutting device and a cutter bit 15 including a rectangular cross-section shank 16 which fits into receptacle 10 and is retained therein by transverse pin 30. Applicant's invention is believed distinct from this patent in that (1) the torque transmitted in the patented device is not rotary and (2) the shank 16 requires a groove 36 to mesh with pin 30.

U.S. Pat. No. 3,606,407, which discloses a shaft coupling including receptacle 33 of cubical dimensions, cubical shaft end key 30 which fits into receptacle 33, half-cylindrical retainers 42, 44 and set screw 58. Applicant's invention is believed distinct from the patented device since applicant's pin retainer is less cumbersome than patentee's half-cylinders and set screw.

U.S. Pat. No. 3,867,050 to Pitner which shows, for example in FIGS. 1 and 2, a substantially rectangular cross-section shaft 3 placed in a corresponding receptacle 6 and retained therein with bolt 21 tightened by nut 22. The requirement of tightening the coupling is believed to distinguish this patent from applicant's invention.

Applicant is further aware of U.S. Pat. Nos. 2,355,781 to Cardinal and 2,869,842 to Schmidt which are believed less relevant than the above discussed patents.

SUMMARY OF THE INVENTION

Applicant's invention is believed to constitute a patentable improvement over the prior art as providing a coupling device which is as reliable or more reliable than those embodied in the prior art yet is much simpler in construction. Furthermore, the present invention is believed to constitute a patentable device since:

(1) The retaining pin herein transmits no torque; its sole purpose is to retain in place in the receptacle a square cross-section shaft end and to resist the radial displacement of the shaft due to the action of outside forces such as, for example, gravity and, in the event of slight shaft imbalances, centrifugal forces;

(2) The square cross-section shaft end and receptacle are designed to fit together loosely, intentionally, in order to facilitate quick change from one machine to another by removing the shaft in a radial direction; in this vein, the pin requires no tools for installation or removal; further, the angular end wall of the receptacle serves to guide the shaft into position therein;

(3) The invention herein is easier to manufacture, requires fewer parts and is easier to install and remove than any known prior art inventions.

Accordingly, it is a first object of the present invention to provide a pin lock which couples a drive shaft to a driven shaft.

It is a further object of the present invention to provide a pin lock including a simple key to receptacle connection which is maintained by a simple pin.

It is a still further object of the present invention to provide a pin lock which facilitates quick changeover from one machine to another.

It is a yet further object of the present invention to provide a pin lock which is easy to manufacture, requires only two parts and is easy to install and remove.

These and other objects, features and advantages of the invention will be apparent to those skilled in the art by the following detailed description of a preferred embodiment taken with the accompanying drawings.

BRIEF DESCRIPTION OF THE DRAWINGS

FIG. 1 shows a top view of a pin lock in accordance with the present invention;

FIG. 2 shows a side view of the pin lock of FIG. 1;

FIG. 3 shows an end view looking into the receptacle of the pin lock of FIGS. 1 and 2;

FIG. 4 shows a cross-sectional view along the line 4—4 of FIG. 2; and

FIG. 5 shows a perspective view of the invention.

Referring to FIGS. 1-5, the inventive pin lock 10 is seen to include a shaft portion 12 which may be solid or hollow as desired and a receptacle portion 20 which are integrally connected to one another at a circular interface 13. The shaft portion is preferably generally cylindrical and includes at its extreme end 15 a taper 14 and a key 16 formed by walls 17, 18, 19. The key 16 is provided to enable the pin lock 10 to be rigidly coupled to a drive shaft (not shown). At this juncture it is noted that the portion 12 may be made of any elongated shape which allows torque transmission and further, the key 16 may be made of any configuration allowing connection to a drive shaft.

The receptacle portion 20 includes a truncated conical section 21 immediately adjacent the interface 13, which section 21 includes a bottom wall 23 comprising a back wall of receptacle 25. The receptacle 25 also is bounded by bottom wall 27, and side walls 29, 31 and is open at its open portion which is defined by extending protrusions 33, 35 on respective side walls 29, 31. Holes 37, 39 are formed in the respective protrusions 33, 35, which holes are provided to receive a pin 41 therethrough as best shown in FIGS. 1 and 5. Pin 41 has at its extreme ends 43 and 45, respective transverse holes 47, 49 which receive transverse pins 51, 53 which act to retain the pin 41 in the holes 37, 39. An angular wall 55 connects the bottom wall 23 with a peripheral wall portion of the truncated conical section 21.

As is seen in the drawings a shaft 60 including a substantially square end 61 loosely fits into the receptacle 25 and is radially retained therein by pin 41. The pin lock 10 includes no means to prevent axial movement of the shaft 60 with respect to the receptacle 25. Axial retention can be obtained by using some device or other means, at opposite ends of the square cross-section shaft 60. As best seen in FIG. 3, side walls 29, 31 form the inner periphery of respective legs 30, 32 which respectively merge with protrusions 33, 35. Further, the bottom wall 27 forms the inner periphery of curved leg 28 which connects together legs 30, 32.

In the preferred embodiment, the key lock 10 is cast from grade 80-60-03 nodular cast iron and the pin 41 is made of cold rolled mild steel, however, these are merely examples of the material and means of fabrication possible for the present invention. For example, the pin lock 10 could be forged or otherwise machined or could be formed as a plurality of pieces welded together.

In use, the end 15 of the shaft portion 12 is coupled through key 16 or other suitable means to a drive shaft. A driven shaft with end cross-section corresponding to receptacle 25 is placed therein and radially retained by pin 41 which is axially retained by transverse pins 51, 53. If desired, however, the receptacle 25 may receive the drive shaft and the driven shaft may be connected to shaft portion end 15.

Various changes may be made to the above described embodiment without departing from the spirit and scope of the present invention which is intended only to be limited by the appended claims.

I claim:

1. A pin lock comprising:
   (a) a shaft portion having a first end and a second end, said first end including connection means adapted to connect said first end to one of drive means or driven means;
   (b) a receptacle portion having a first end connected to said shaft portion second end and a second end including receptacle means adapted to connect said receptacle portion second end to the other of said drive means or driven means; and
   (c) pin means associated with said receptacle portion for preventing radial movement of said other of said drive means or driven means with respect to said receptacle portion, said pin means being solely engageable with peripheral portions of said other of said drive means or driven means said receptacle portion further including a substantially truncated conical region interposed between said shaft portion second end and said receptacle means.

2. The invention of claim 1, wherein said shaft portion connection means comprises key means.

3. The invention of claim 1, wherein said receptacle means comprises a generally cubical chamber having four closed sides and two open sides, a first of said two open sides comprising an opening for receiving a shaft member comprising the other of said drive means or driven means and a second of said two open sides being traversed by said pin means.

4. The invention of claim 3, wherein said shaft member comprises driven means.

5. The invention of claim 3, wherein two of said four closed sides define opposed walls and further wherein said pin means extends through holes aligned in said two of said four closed sides.

6. The invention of claim 5, wherein said pin means includes a pin hole at one end thereof and a pin member is inserted in said pin hole to retain said pin means in said aligned holes.

7. The invention of claim 1, wherein said shaft portion is cylindrical.

8. The invention of claim 2, wherein said key means comprises a cutout portion in said shaft portion defined by three substantially flat sides.

9. A method of coupling a drive shaft to a driven shaft comprising
   (a) providing a pin lock comprising a shaft portion and a receptacle portion in an integral assembly, said receptacle portion including a substantially truncated conical region adjacent said shaft portion;
   (b) coupling said shaft portion to one of said drive shaft or driven shaft;
   (c) placing an end of the other of said drive shaft or driven shaft into said receptacle portion; and
   (d) installing pin means on said receptacle portion in overlying relation to said other of said drive shaft or said driven shaft to thereby prevent radial uncoupling movement thereof with respect to said receptacle portion.

10. The method of claim 9, wherein said one of said drive shaft or driven shaft comprises said drive shaft.

11. The method of claim 9, wherein said other of said drive shaft or driven shaft comprises said drive shaft.

12. The method of claim 9, wherein said receptacle portion includes an angular end wall therein and further including the step of using said angular end wall to guide said end of said other of said drive shaft or driven shaft into said receptacle portion.

* * * * *